United States Patent [19]

Radovic et al.

[11] Patent Number: 5,049,109

[45] Date of Patent: * Sep. 17, 1991

[54] HOG SCRAPER PADDLE

[76] Inventors: Milorad Radovic, 12364 27 Mile Rd., Washington, Mich. 48094; John Mirkovich, 2531 Lakeshore Rd., Applegate, Mich. 48401; Boja J. Loncarski, 2790 Mayfair, Troy, Mich. 48084

[*] Notice: The portion of the term of this patent subsequent to Mar. 13, 2007 has been disclaimed.

[21] Appl. No.: 492,625

[22] Filed: Mar. 13, 1990

Related U.S. Application Data

[63] Continuation-in-part of Ser. No. 269,080, Nov. 9, 1988, Pat. No. 4,907,317.

[51] Int. Cl.⁵ .................................. A22B 5/08
[52] U.S. Cl. ........................... 452/97; 452/94
[58] Field of Search ............... 452/97, 96, 94, 104

[56] References Cited

U.S. PATENT DOCUMENTS 2,029,064  1/1936  Edwards ..................... 452/97
2,758,334  8/1956  Adams, Jr. et al. ............ 452/97
4,907,317  3/1990  Radovic et al. ............... 452/97

Primary Examiner—Willis Little
Attorney, Agent, or Firm—Lynn E. Cargill

[57] ABSTRACT

Disclosed is a hog scraper paddle for dehairing and polishing hog carcasses and the like, including a resiliently flexible paddle body having a substantially rectangular block shape, said body being made of an easy-to-clean, substantially non-porous thermoplastic material having a softening temperature endotherm peak greater than about 350° F. and a flexular modulus value between about 100 and 150,000 psi preferably either between about 100 and 6,000 or between about 30,000 and 150,000 psi. The paddle body may include a mounting means and openings therein for receiving the mounting means. At least one scraper blade may be attached to the paddle body for dehairing or polishing a carcass. Also disclosed is a method for making a hog scraper paddle of thermoplastic material by injection molding, compression molding, or blow molding. Post manufacturing treatments, such as annealing and heating are also disclosed.

5 Claims, 1 Drawing Sheet

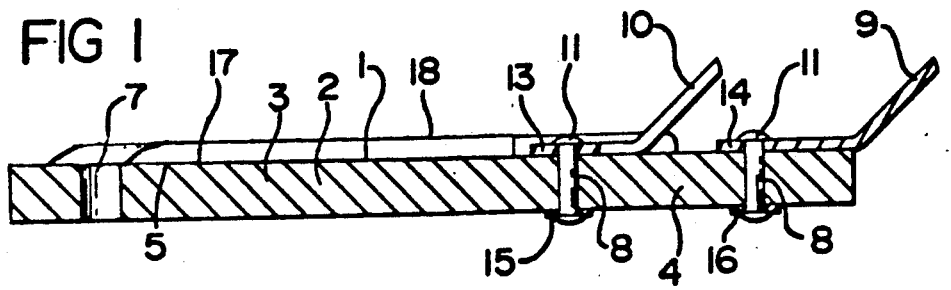
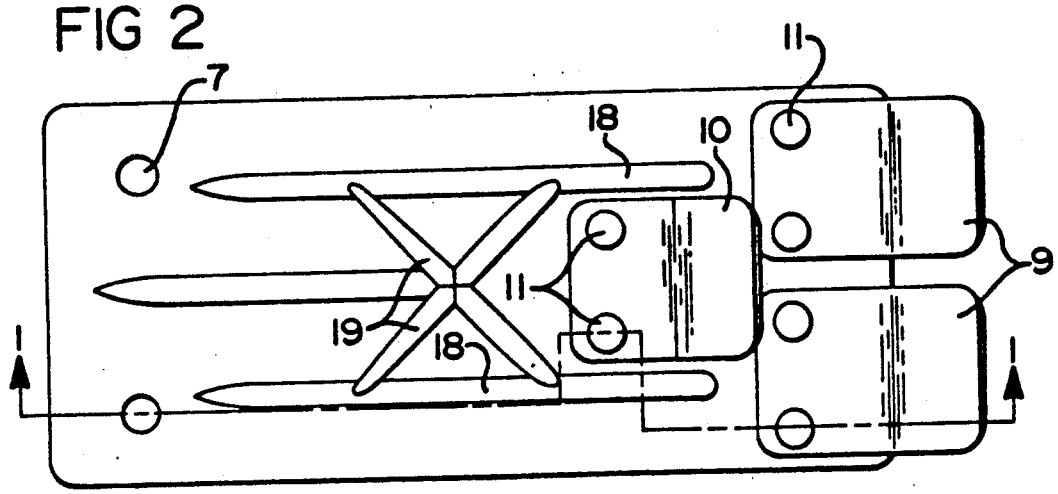
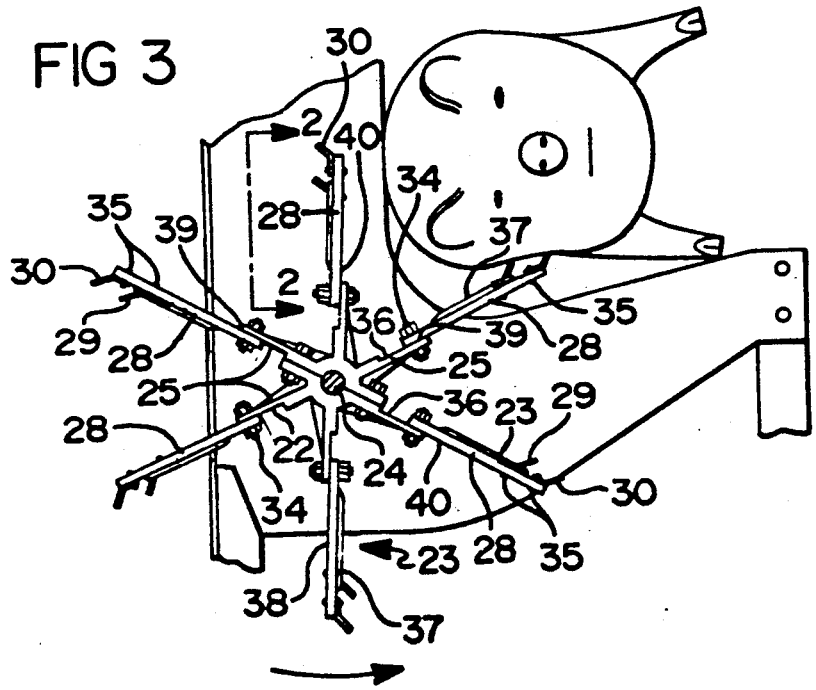

HOG SCRAPER PADDLE

This application is a continuation-in-part of co-pending application U.S. Ser. No. 07/269,080, filed on Nov. 9, 1988, now U.S. Pat. No. 4,907,317.

TECHNICAL FIELD

This invention relates to a hog scraper paddle for dehairing and polishing machines, and more particularly, to a hog scraper paddle made of an easy to clean material.

BACKGROUND OF THE INVENTION

During the past century, many different hog scraper paddles have been designed for use in meat packing plants. The hog paddle is used to lift, dehair and polish a carcass as it is going through a cavity. Generally, the hog paddles are attached to a star wheel or a rotary machine which lifts and scrapes the carcass as it passes therethrough. In the past, the hog paddles required frequent replacement, especially when dehairing very heavy sows. Lighter weight hogs, such as those in the weight range of 175 to 200 pounds will cause a standard hog paddle to break within approximately 2 to 3 months. However, when dehairing heavy sows, such as those from 600 to 800 pounds, the paddles may be rendered ineffective nearly instantaneously thereby requiring replacement. Conventional hog paddles have been made out of reinforced ply rubber, such as those produced by Gates Rubber Company.

Making sure the paddles are clean is of utmost importance in a meat packing plant. Conventional hog paddles are made of black rubber and are therefore difficult to inspect because the hog hairs and debris collected by the paddles during the dehairing operation are substantially the same color as the hog paddles, and are difficult to see. Conventional rubber paddles are reinforced with woven duck or canvas material, for the most part, and once the rubber has worn away, the cords or strings of the reinforcing material are exposed and act as a breeding ground for bacteria and undesirable odors. For health inspection reasons, the worn paddles do not comply with the USDA standards, and must be replaced. Therefore, even if the hog paddle is still functional, due to health reasons, the paddle requires replacement. It would be advantageous for the meat packing industry to have a hog paddle which is non-porous, easy to clean, easy to inspect, and deters the breeding of bacteria.

Previously, the concern of greatest importance was the longevity of the hog paddle. Many attempts have been made to increase the lifetime of the paddle, and some of them have succeeded to varying degrees. The following are examples of prior attempts to add to the longevity of hog paddles.

U.S. Pat. No. 965,293 issued July 26, 1910 to Gussenhoven describes a beater for hog scraping machines. To increase the longevity of the paddle by avoiding the "set" at the point of the bend of the hog paddle, a cushion was used to press against the portion of the strap mounted to the dehairing machine.

U.S. Pat. No. 1,270,239 issued June 18, 1918 to Jordan, discloses a mounting which allows for a swinging movement with respect to the paddle and which is bendable beyond the limits of the mounting. This is designed to alleviate stress at the bending point, thereby increasing the lifetime of the paddle.

U.S. Pat. No. 2,092,483 issued Sept. 7, 1937 to Todd discloses a hog paddle which is transversely split at one end to increase its flexibility and therefore its lifetime.

U.S. Pat. No. 2,296,873 issued Sept. 29, 1942 to Rachford discloses a dehairing beater element which comprises a block of flexible fabric material having a free end performed in a set arcuate shape. The paddle is made of a rubber impregnated fabric.

U.S. Pat. No. 2,604,656 issued July 29, 1952 to Anderson, et al. discloses a hog beater paddle wherein the paddle is reinforced by two sets of layers of fabric-like material extending between the inner and outer ends of the paddle and the sets being disposed in a basically parallel relationship, but spaced apart as they extend from the inner end to the outer end.

U.S. Pat. No. 2,758,334 issued Aug. 14, 1956 to Adams, Jr., et al. discloses a hog paddle having a intermediate fabric section enveloping an inner body of the paddle, while an outer rubber section encases the fabric part, the fabric part being composed of nylon.

U.S. Pat. No. 2,029,064 issued Jan. 28, 1936 to Edwards discloses a carcass scraper which has a substantially continuous uniform taper progressively varying the thickness adjacent to the mounting connection so that deflection of the body during the use of the scraper is distributed over a substantial portion of the length of the body, thereby increasing the lifetime of the paddle.

U.S. Pat. No. 4,570,297 issued Feb. 18, 1986 to Nijhuis, discloses a scraper block for a dehairing machine which includes a leaf spring interposed between elastic material for increasing the lifetime of the paddle body.

It is the primary object of the present invention to provide a hog paddle which is easy to clean, and one which will address USDA cleanliness concerns as the paddle:

1. is made of a non-porous material;
2. is made of a material which has a sufficiently light color to allow for easy inspection; and
3. is made of a material which is easy-to-clean by standard methods.

It is an object of the present invention to provide a hog paddle for use in a dehairing or polishing machine which will overcome the disadvantages of the above mentioned previous attempts. In carrying out that object, materials and designs have been selected which will (1) provide a thermoplastic hog paddle having a flexural modulus value in a useful range; (2) withstand and resist swelling due to contact with water and animal fats; (3) increase the lifetime of the paddle by withstanding repeated heavy loads; (4) add capacity and volume while handling higher hog carcass loading speeds than previous paddles; and (5) provide a paddle which is easy-to-clean, easy to inspect, as well as one which is non-porous and is not amenable to the breeding of bacteria and other germs which cause health hazards to ultimate consumers.

SUMMARY OF THE INVENTION

In carrying out the above mentioned objects of the invention, a hog scraper paddle is disclosed which includes a relatively thick, substantially rectangular block shaped, resiliently flexible paddle body made of an easy-to-clean, non-porous thermoplastic material having a softening temperature endotherm peak greater than about 350 degrees F and a flexural modulus value between about 100 and 150,000 psi preferably between about 100 and 6,000 and between about 30,000 and 150,000 psi selected from the group consisting of. value The thermoplastic material may be selected from the group consisting of thermoplastic polyester elastomers, thermoplastic urethane and polyurethane elastomers, thermoplastic rubbers and nylon thermoplastics. The materials which have been found to be particularly useful are HYTREL, a registered trademark of DuPont Corporation of Wilmington, Delaware and LOMOD, a registered trademark of General Electric Co. of Pittsfield, Massachusetts. The most useful HYTREL compositions for the dehairing paddles include ones having flexural modulus values greater than about 30,000 psi. Further in accordance with the invention, the paddle body will have a lengthwise dimension of from about 6 to 15 inches, and a width dimension from about ¾ to 8 inches depending upon the application. In order to provide reinforcement to the paddle body while allowing for sufficient memory action of the plastic material, reinforcing ribs extending lengthwise across one surface of the paddle body may also be included. Additionally, chevron design ribs may be used. The preferred configuration for the reinforcing ribs includes three lengthwise ribs, with criss crossing ribs intercepting the lengthwise ribs.

The preferred materials are desirable due to their material properties. Their tensile strengths and flexibilities are necessary for exhibiting a long lifetime for the hog paddle in operation. As tensile stress properties at both low and high strain needs require a relatively high value, the polyester, urethane and polyurethane elastomers are good candidates for the application. It must be realized, though, that new materials may be developed which have these properties and those materials would also fulfill the objects of the invention.

BRIEF DESCRIPTION OF THE DRAWINGS

Other objects and advantages of the present invention will become apparent upon reading the following detailed description and upon reference to the drawings in which:

FIG. 1 is a side elevational view of a hog scraper paddle constructed in accordance with the present invention;

FIG. 2 is a top plan view of the present invention illustrating the location of the scraper blades and the reinforcing ribs; and FIG. 3 is a front elevation view of a portion of a dehairing machine for removing hair from a hog carcass.

DETAILED DESCRIPTION OF THE DRAWINGS

The construction of a hog scraper paddle according to the invention will be explained by reference to the first embodiment in FIG. 1. The hog paddle 1 consists of a slab of thermoplastic material, said material being continuous therethroughout. The material is relatively thick, substantially rectangularly block-shaped and resiliently flexible. The thermoplastic material is easy-to-clean, non-porous and may be selected from the group consisting of thermoplastic polyester elastomers, thermoplastic urethane and polyurethane elastomers, thermoplastic rubbers and nylon thermoplastics. The preferred materials generally have a softening temperature endotherm peak greater than about 350° F. and a flexural modulus value of between about 100 and 150,000 psi preferably between about 100 and 6,000 and between about 30,000 and 150,000 psi selected from the group consisting of. The paddle body includes openings for receiving mounting bolts to secure the paddle to the star wheel of a dehairing or polishing machine. Other embodiments may include composite layering of varying materials.

At least one scraper blade is attached to the paddle body for dehairing a carcass at the end opposite the mounting end. Hog paddle 1 is rectangularly block-shaped and includes a continuous body of material 2 and includes mounting end 3 and scraper blade end 4. Mounting end 3 includes at least one bore 7 to receive a fastening bolt or rivet (not shown) to attach the hog paddle to a star wheel. Near the other end, scraper end 4, a plurality of holes 8 are provided for scraper blades 9 and 10 respectively, to be fastened in a known manner with the aid of rivets, bolts, and other conventional means, represented demonstratively as number 11. Flat portions 13 and 14, respectively, of the scraper blades 10 and 9 are held secure to the surface of the hog paddle 1 by washers 15 and 16 disposed on the opposite side.

Turning again to FIG. 1, upper surface 17 may further include reinforced ribs 18 to add strength to the hog paddle. Reinforcing ribs 18 aid in proper flexing of paddle 1 as it must be sufficiently thin to flex, yet they provide a sufficient thickness to exhibit effective memory action of the thermoplastic. The ribs may run lengthwise along the longitudinal axis, in a multiple chevron design, or may criss-cross across the surface of the paddle as will be more fully described with further reference to FIG. 2.

The preferred material for the hog paddle is thermoplastic polyester elastomer, such as materials called HYTREL, sold and distributed by DuPont Corporation of Wilmington, Delaware, or LOMOD, sold and distributed by General Electric Co. of Pittsfield, Massachusetts. HYTREL and LOMOD are registered trademarks. While the invention may be described in connection with a preferred embodiment including HYTREL or LOMOD, it must be understood that it is not intended to limit the invention to that embodiment. On the contrary, it is intended to cover many different plastic materials and their modifications which include thermoplastic polyester elastomers, thermoplastic urethane and polyurethane elastomers, and nylon thermoplastics. Some of the polyester elastomers may include butylene/poly (alkylene ether) phthalate with stabilizers. As material science develops, other materials will fit the performance criteria disclosed above and in the claims. These materials are necessary in order to be strong, easy-to-clean, easy to inspect and to have sufficient resilience and flexibility to withstand repeated beatings of the carcasses. HYTREL G5546 is especially useful for the shorter dehairing paddles due to its medium modulus rating while HYTREL 3358 is especially useful for longer, polishing paddles due to its low modulus rating. HYTREL 3358 has a Shore-D hardness of 33 and a flexular modulus at 73° F. of about 5,000 psi using ASTM test D790, and HYTREL G5546 has a flexular modulus of about 30,000 psi as measured using the same test. The materials HYTREL 6356 and 7246 have also been found to be very useful and have Shore-D hardness values of 63 and 72, respectively. LOMOD B0200 and B0800 are also particularly useful.

Referring now to FIG. 2, a hog paddle constructed in accordance with the present invention is illustrated, showing the relative placement of scraper blades 9 and 10 respectively, rivets 11, reinforcing ribs 18 and reinforcing intersecting ribs 19. According to the invention, the hog paddle may be constructed of a high strength plastic material, and it may not be necessary to include the reinforcing ribs 18 and intersecting ribs 19. For certain plastics, it has been found to be advantageous to include only reinforcing ribs 18, while in other embodiments of the present invention, intersecting ribs 19 add flexural and tensile strength so that the paddle has a greater capacity for memory.

Varying sizes for the paddle illustrated in FIG. 2 have been contemplated for various purposes. For dehairing operations, shorter paddles, from about 6 to about 8 inches with a lesser flexibility are useful. For polishing operations, paddles having the same width, but lengths from 8 to 15 inches, have been indicated. Narrow paddles of varying lengths, having widths from ¾ to about 5 inches, are useful for special applications, such as dehairing the necks, ears, legs and other such hard-to-reach places.

The methods for making the paddles described above may include injection molding, compression molding and blow molding. The pressures utilized for such methods vary depending upon the machine (s) used, the material employed and many other different parameters. Each material will having its own best manufacturing parameters. The thermoplastics have been injection molded in machines with shot sizes ranging from one ounce to over sixteen pounds using standard thermoplastic injection molding practices. General purpose screws of the type used for polyethylene are acceptable. Post-manufacturing treatments, such as heating and annealing, have also been found to be useful to add to the longevity of the plastic.

In keeping with the invention, FIG. 3 best illustrates the hog paddle in operation. Although there are many different forms of dehairing or polishing machines in which the improved paddles of the invention may be utilized, FIG. 3 illustrates a portion of a chute which includes a grate 20 having openings (not shown) through which the star wheels 22 may carry the hog paddles 23. This type of chute includes a grate 20 upon which the carcass 21 of a hog or other animal to be scraped may be supported, while one or more star wheels 22 rotate around drive shaft 24 to bring hog paddles 23 into contact with hog carcass 21. It may be seen that as hog carcass 21 is supported by grate 20, hog paddles 23, which are mounted to star wheel 22 by mounting means 25, contacts the carcass, and scrapes it by scraper blades 26. Scraper blades 26 are fastened to the hog paddle 23 by rivets, bolts or other fastening means 27. As star wheels 22 and hog paddles 23 rotate around drive shaft 24, hog carcass 21 is moved through the chute partially by gravity, and partially by the motion of lifting and scraping the carcass. Varying lengths and widths of the paddles may be embodied for dehairing, or final treatment machines depending upon the needed application. One of ordinary skill in the art will realize all of the many dehairing, polishing, and finishing machines within which these paddles may be utilized.

Thus it is apparent that there has been provided, in accordance with the invention, a hog paddle and a method for making the same that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A hog scraper paddle for dehairing and polishing hog carcasses and the like, comprising:
    a resiliently flexible substantially rectangularly block-shaped paddle body, said paddle body being made of an easy-to-clean, substantially non-porous thermoplastic material having a softening temperature endotherm peak greater than about 350° F. and a flexural modulus value selected from the group consisting of between about 100 and 6,000 psi and between about 30,000 and 150,000 psi.
    mounting means for securing the paddle body to a dehairing machine;
    said paddle body having an end for receiving the mounting means to secure the paddle body to the dehairing machine; and
    at least one scraper blade attached to the paddle body for dehairing a carcass.

2. A hog scraper paddle for dehairing said polishing hog carcasses and the like, comprising:
    a resiliently flexible substantially rectangularly block-shaped paddle body, said paddle body being made of an easy-to-clean, substantially non-porous thermoplastic material having a softening temperature endotherm peak greater than about 350° F. and a flexural modulus value selected from the group consisting of between about 100 and 6,000 psi and between about 30,000 and 150,000 psi;
    reinforcing ribs extending in a lengthwise direction partially covering and attaching to the paddle body;
    mounting means for securing the paddle body to a dehairing machine;
    said paddle body having an end for receiving the mounting means to secure the paddle body to the dehairing machine; and
    at least one scraper blade attached to the paddle body for dehairing a carcass.

3. The hog paddle of claim 2, wherein said paddle has a lengthwise dimension of from about 6 inches to 15 inches, and a width dimension of from about ¾ to 8 inches.

4. A hog scraper paddle for dehairing and polishing hog carcasses and the like, comprising:
    a substantially rectangular block-shaped, resiliently flexible paddle body made of an easy-to-clean non-porous polyurethane elastomer having a flexural modulus value selected from the group consisting of between about 100 and 6,000 psi and between about 30,000 and 150,000 psi, said paddle body having a mounting end and a scraper end;
    said paddle body having a length dimension of from about 6 inches to 15 inches and a width dimension of from about ¾ inches to 8 inches;
    mounting means for securing the paddle body to a dehairing and polishing machine;
    said paddle body mounting end including openings therein for receiving the mounting means to secure the paddle body to a dehairing and polishing machine; and
    at least three scraper blades attached to the scraper end of the paddle body.

5. The hog scraper paddle of claim 1, wherein said paddle body is made of a light-colored polyurethane elastomer.

* * * * *